(No Model.)
C. A. H. LAUDON.
DRAFT EQUALIZER FOR HARVESTERS.
No. 376,663. Patented Jan. 17, 1888.
Fig. 1.
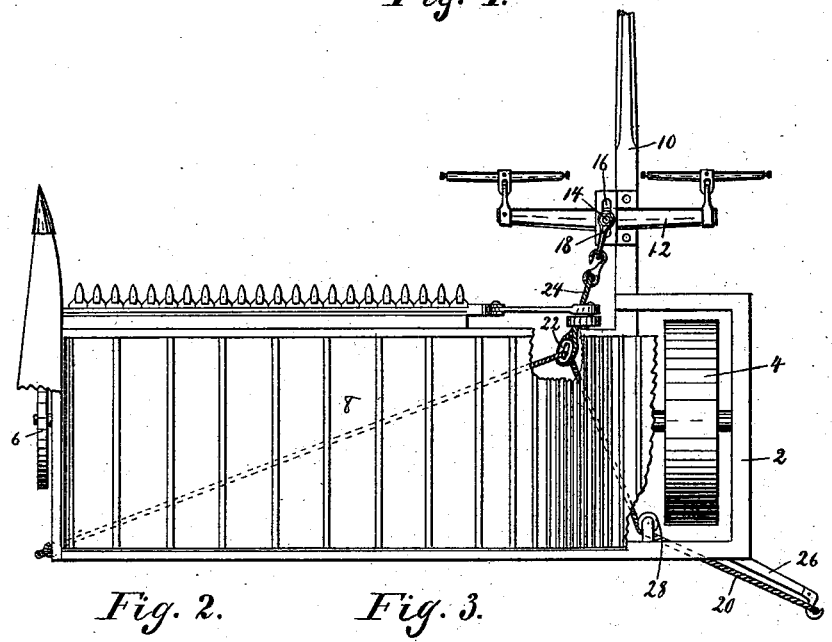
Fig. 2.
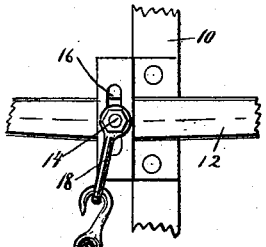
Fig. 3.
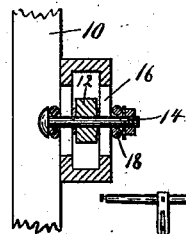
Fig. 4.
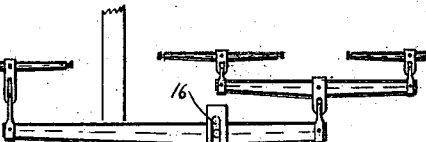
Fig. 5. Fig. 6. Fig. 7.
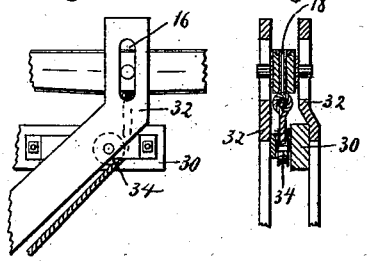
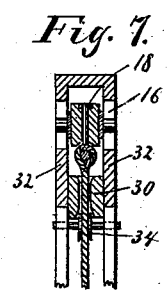
Witnesses.
J. Jessen.
S. J. Beardslee.
Inventor.
C. A. Herman Laudon.
By C. C. Paul Atty.

UNITED STATES PATENT OFFICE.

C. A. HERMAN LAUDON, OF SHERMAN, ASSIGNOR TO LOUIS LAUDON, SR., OF DOVER, MINNESOTA.

DRAFT-EQUALIZER FOR HARVESTERS.

SPECIFICATION forming part of Letters Patent No. 376,663, dated January 17, 1888.

Application filed November 2, 1887. Serial No. 254,059. (No model.)

*To all whom it may concern:*

Be it known that I, C. A. HERMAN LAUDON, of Sherman, in the county of Redwood and State of Minnesota, have invented certain Improvements in Draft-Equalizers for Harvesters and Reapers, of which the following is a specification.

My invention relates to improvements in draft-equalizers to be used on harvesting or reaping machines, and the object I have in view is to obviate the side draft incident to machines of this class and to apply the draft in a simple and effective manner.

My invention consists, generally, in the combination and arrangement hereinafter described, and particularly pointed out in the claims.

In the drawings, which form a part of this specification, Figure 1 is a plan view of a portion of a reaper with my improvement adapted thereto. Figs. 2 and 3 are details showing the manner of attaching the evener to the pole. Fig. 4 is a modification. Figs. 5, 6, and 7 are details.

In the drawings 2 represents the frame of an ordinary harvester, supported at one side by the drive-wheel 4 and at the other by the grain-wheel 6. The platform 8 extends over this frame, and to the said frame are secured the various working parts of the machine necessary to its construction.

10 represents the pole, which is also secured to the frame and extends forward to form a guide for the machine.

12 represents an evener, preferably located on the top of the pole and extending through a yoke or frame secured to the said pole. The evener is free to slide longitudinally in this yoke.

14 represents a bolt or pin, which passes through the evener 12 and through the slots 16, of any convenient length, in the yoke, and by this means the said evener is retained in its proper lateral position. The bolt 14 preferably extends above and below the yoke sufficiently to receive the clevis 18, which extends over the end of said yoke and is capable of supporting the entire strain brought upon the evener and relieving the pole from the forward draft of the machine.

20 represents a cable or chain, which is preferably attached to the frame of the machine at or near the two rear corners, and extends diagonally forward underneath the apron to some convenient point, where it is attached by a ring, 22, or other suitable connection to the rod or cable 24, secured to the clevis 18. As an equivalent construction, the cable 20 might be connected directly with the clevis 18 without the use of the ring 22 and cable 24.

A beam, 26, may be placed at the rear of the drive-wheel and secured to this portion of the frame. This beam preferably extends backward at an angle to the frame, to more fully equalize the strain upon this portion of the machine. The length and position of this beam are determined by the amount of side draft on the machine. In some instances I may be able to do away with it and attach the cable directly to the corner of the frame.

28 represents a pulley or sheave secured in suitable bearings to the frame and over which the cable 20 passes. The object of this pulley is to prevent the cable from coming in contact with the drive-wheel, and is preferably placed as near as possible to the said drive-wheel in order to deflect the cable as little as possible.

I do not confine myself to the use of a cable or chain for the equalizing device, as a rod or rods may be adapted to take the place of the cable 20 with equally good results.

In Fig. 4 I have shown my device as constructed when more than two horses are used. I have shown it as applied with three horses; but it may be used equally well and with similar construction with four horses upon the evener. In this construction 30 represents a beam or brace secured at one end to the tongue and extending outward in front of the drive-wheel. Above and below this brace I prefer to place the flat bars 32, which extend diagonally from the frame to the brace 30, and receive the evener in front of said brace, as shown in Figs. 4 to 7. The pin or bolt in the evener extends through the slots in the bars 32, which form a lateral guide for the said evener. The clevis, to which the cable 24 is attached, is secured to the evener between the bars 32, and the cable 24 extends backward and passes over the pulley 34, located in line with this clevis. After passing the pulley, the cable is carried diagonally toward the center of the machine until the point is reached where it is joined to the ring 22 and cable 20.

A modification of the evener attachment is shown in Figs. 5 and 6, in which the plates 32 are separate from each other and the pulley or sheave over which the rope or cable passes is held in independent bearings. The construction and operation, however, are substantially the same as that already described.

It will be seen that by the use of my improvement I am enabled to exert a forward strain on the inner portion of the frame or grain side of the machine and also to retard the forward movement of the outer portion, thus equalizing the strain and preventing the side draft of the machine.

Some advantages of this construction are that a wider cut can be made, especially in the heavier class of machines, such as platform-binders. The frame, the platform, and with them the finger-bar, are supported more equally and are less liable to be overstrained. The machine will be drawn more easily, as the whole strain of pulling comes below the axles of the drive-wheel and tends to lift the machine instead of crowding it down to the ground, as is the case with the ordinary draft attachment.

I claim as my invention—

1. The combination, with the frame 2 and the tongue 10, of the evener 12, held in sliding bearings, and the equalizing-cable secured to the rear corners of the frame 2 and connected with said evener, substantially as described.

2. In a harvester, the combination, with the frame 2 and the tongue 10, of the evener 12, held in sliding bearings upon said tongue, the equalizing-cable 20, secured to the frame at the rear corners, and the rod or cable 24, connecting said evener with said equalizing-cable, all substantially as described.

3. In a harvester, the combination, with the frame 2, of the beam 26, attached to and extending outward from said frame, the cable 20, the sheave 28, over which said cable passes, and the draft device attached to said cable 20, substantially as and for the purpose set forth.

4. The draft-equalizer consisting of the cable 20, secured to the frame 2, the ring 22, the rod 24, the clevis 16, and the evener 12, all substantially as described.

In testimony whereof I have hereunto set my hand this 25th day of October, 1887.

C. A. HERMAN LAUDON.

In presence of—
O. QUAMSOE,
PETER E. WICKEN.